(12) United States Patent
Venkatachalam et al.

(10) Patent No.: US 10,746,673 B2
(45) Date of Patent: Aug. 18, 2020

(54) INSPECTION OF GROUTING BETWEEN MONOPILE AND TRANSITION PIECE ON OFFSHORE WIND TURBINES

(71) Applicant: Oceaneering International, Inc., Houston, TX (US)

(72) Inventors: Rajashekar Venkatachalam, Cypress, TX (US); Nate Dieringer, Houston, TX (US); Todd Newell, The Woodlands, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/185,834

(22) Filed: Nov. 9, 2018

(65) Prior Publication Data
US 2019/0137420 A1    May 9, 2019

Related U.S. Application Data

(60) Provisional application No. 62/583,624, filed on Nov. 9, 2017.

(51) Int. Cl.
| | |
|---|---|
| *G01N 23/18* | (2018.01) |
| *G05D 1/02* | (2020.01) |
| *G01N 23/203* | (2006.01) |
| *G01N 23/083* | (2018.01) |
| *E02B 17/00* | (2006.01) |
| *B63G 8/00* | (2006.01) |
| *B63B 59/08* | (2006.01) |

(52) U.S. Cl.
CPC ............ *G01N 23/18* (2013.01); *B63G 8/001* (2013.01); *E02B 17/0004* (2013.01); *E02B 17/0034* (2013.01); *G01N 23/083* (2013.01); *G01N 23/203* (2013.01); *G05D 1/0206* (2013.01); *B63B 59/08* (2013.01); *B63G 2008/004* (2013.01); *B63G 2008/005* (2013.01); *B63G 2008/007* (2013.01)

(58) Field of Classification Search
CPC combination set(s) only.
See application file for complete search history.

(56) References Cited

U.S. PATENT DOCUMENTS

| | | | |
|---|---|---|---|
| 2013/0181136 A1* | 7/2013 | Venkatachalam | G01T 1/20 250/363.01 |
| 2015/0112513 A1* | 4/2015 | Kerins | B63G 8/001 701/2 |
| 2015/0373822 A1* | 12/2015 | Churchman | G01N 23/04 378/59 |
| 2016/0208958 A1* | 7/2016 | Kawauchi | B08B 9/023 |

* cited by examiner

*Primary Examiner* — Kyle Armstrong
(74) *Attorney, Agent, or Firm* — Maze IP Law, P.C.

(57) ABSTRACT

An inspection system may be deployed as part of a routine crew transfer diving ("CTV") or service operation vessel (SOV) deployment to perform inspections for analyses which can be conducted while carrying out other inspection tasks. A marinized digital detector array and betatron source may be maneuvered proximate a first detector plate, which can be of a plurality of detector plates and a first exposure generated at the first detector plate which is then used to aid in generating one or more images comprising each such exposure. The images are then reconstructed to identify defects in the grout.

21 Claims, 5 Drawing Sheets

INSPECTION OF GROUTING BETWEEN MONOPILE AND TRANSITION PIECE ON OFFSHORE WIND TURBINES

RELATION TO OTHER APPLICATIONS

This application claims priority through U.S. Provisional Application 62/583,624, filed Nov. 9, 2017.

BACKGROUND

Current methods for inspecting grout are slow, expensive and have significant health and safety issues and also can cause damage to the structure that is inspected. Conventional solutions such as a guided wave inspection method may work well to detect flaws on structures such as pin piles but need a lot of historical data and reference data sets to determine the condition of the grouting in the jacket pin piles. When it comes to grouting, the only alternative inspection method that would work is radiography. Inspections of turbines in a windfarm may be accomplished with a crew transfer diving vessel (CTV) but that is expensive and typically a diving operation does not conduct multiple tasks during an inspection regime.

The grout joint for a monopile foundation sits between the transition piece and the foundation on offshore wind turbines. It is typically formed of high-density concrete between two steel walls. Grout joints have caused significant problems for wind farm operators and are of concern for most of the early offshore wind monopile fleets. There are currently no means of accessing grout for visual inspection. Current methods for inspecting grout are slow, expensive and have significant health and safety-related issues. They can also be damaging to the structure.

FIGURES

Various figures are included herein which illustrate aspects of embodiments of the disclosed inventions.

DESCRIPTION OF EXEMPLARY EMBODIMENTS

The inventions described herein, which may be deployed as part of a routine crew transfer diving ("CTV") or service operation vessel (SOV) deployment, can eliminate additional cost in part because analysis can be conducted as technicians are on a device or structure such as a turbine, carrying out other inspection tasks. Also, the inventions described herein allow for possible performance of a range of subsea inspection operations with a subsea vehicle such as a remotely operated vehicle (ROV) while another device such as a crawler is performing an inspection task and/or remedial tasks as described herein. Expense may also be reduced if the detectors described herein are placed inside a structure such as a monopile and, e.g., permanently installed. In such embodiments, routine inspection tasks may be accomplished by having a subsea vehicle fly to the structure, as described herein.

The inventions described herein also comprise using a subsea vehicle deployed high energy X-ray source and digital detector arrays, typically permanently placed at predetermined locations inside a structure such as a monopole. The subsea vehicle can be flown or otherwise fly to each of these digital detector arrays and apply x-rays to generate an image at that location. The radiographic image can be used to provide information on discontinuities inside the grout that could also be quantified.

Jacket grout can be inspected using subsea vehicle deployed, high energy radiography (eg. Betatron) tool, such as by using a backscatter technique. A marinized high energy radiation source (eg. Betatron) can be mounted or otherwise connected to a subsea vehicle which can fly or be flown to a set of inspection locations and apply x-rays to generate an image at that location. The x-ray source and digital detector arrays may be moved along an arc to help acquire images which can be reconstructed to determine defects within the grout.

Figure 1:
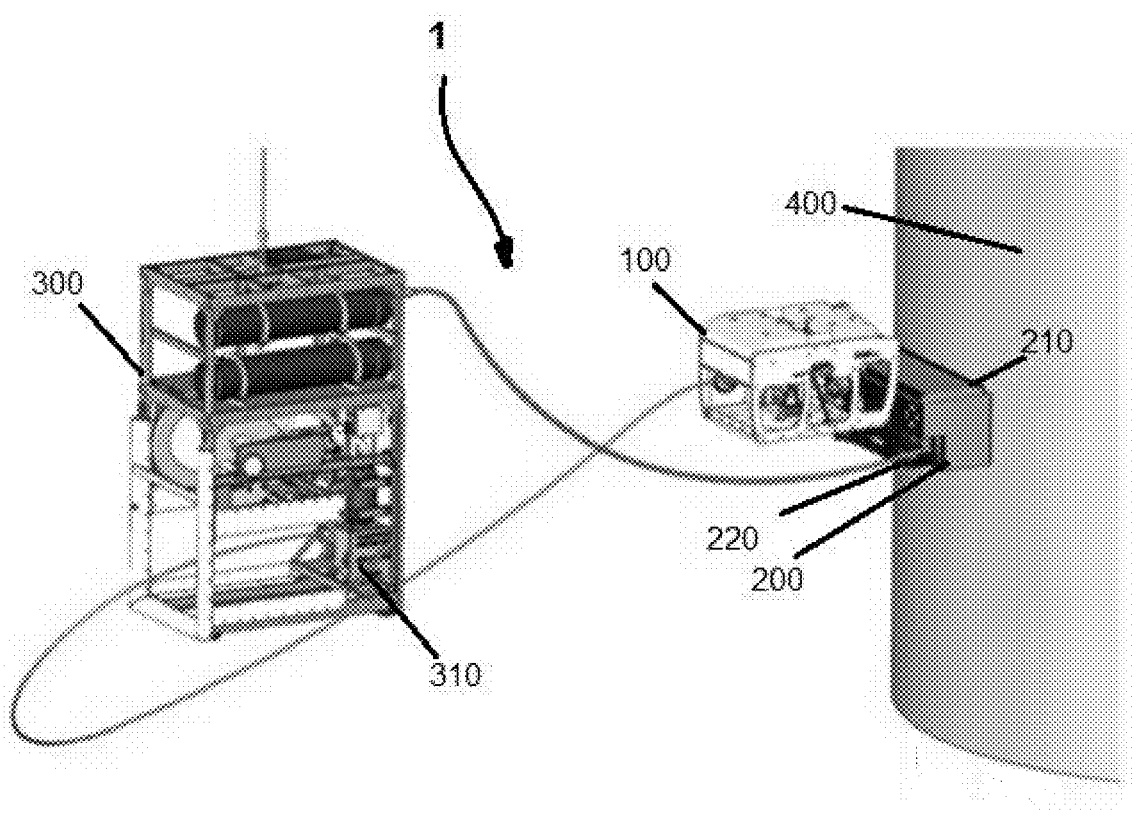
FIG. 1 is a view in partial perspective of an exemplary system for subsea inspection of a monopole grout.

Referring now to FIG. 1, marinized digital detector array and betatron source 200, which is a high energy radiographic tool, comprises one or more X-Ray sources 230 (FIG. 3), one or more digital detector arrays 240 (FIG. 2) adapted to be placed at predetermined location 321 (FIG. 2) inside monopole 320 (FIG. 2) at junction 324 (FIG. 2) between monopole 320 and transition piece 330 (FIG. 2), and detector plate 220.

Referring still generally to FIG. 1, system 1 for subsea inspection of a monopole grout comprises one or more subsea vehicles 100 and marinized digital detector array and betatron source 200. Subsea vehicle 100 may be a remotely operated vehicle (ROV), an autonomous underwater vehicle (AUV) (not shown in the figures), or a hybrid vehicle (not shown in the figures), or the like.

Figure 4:
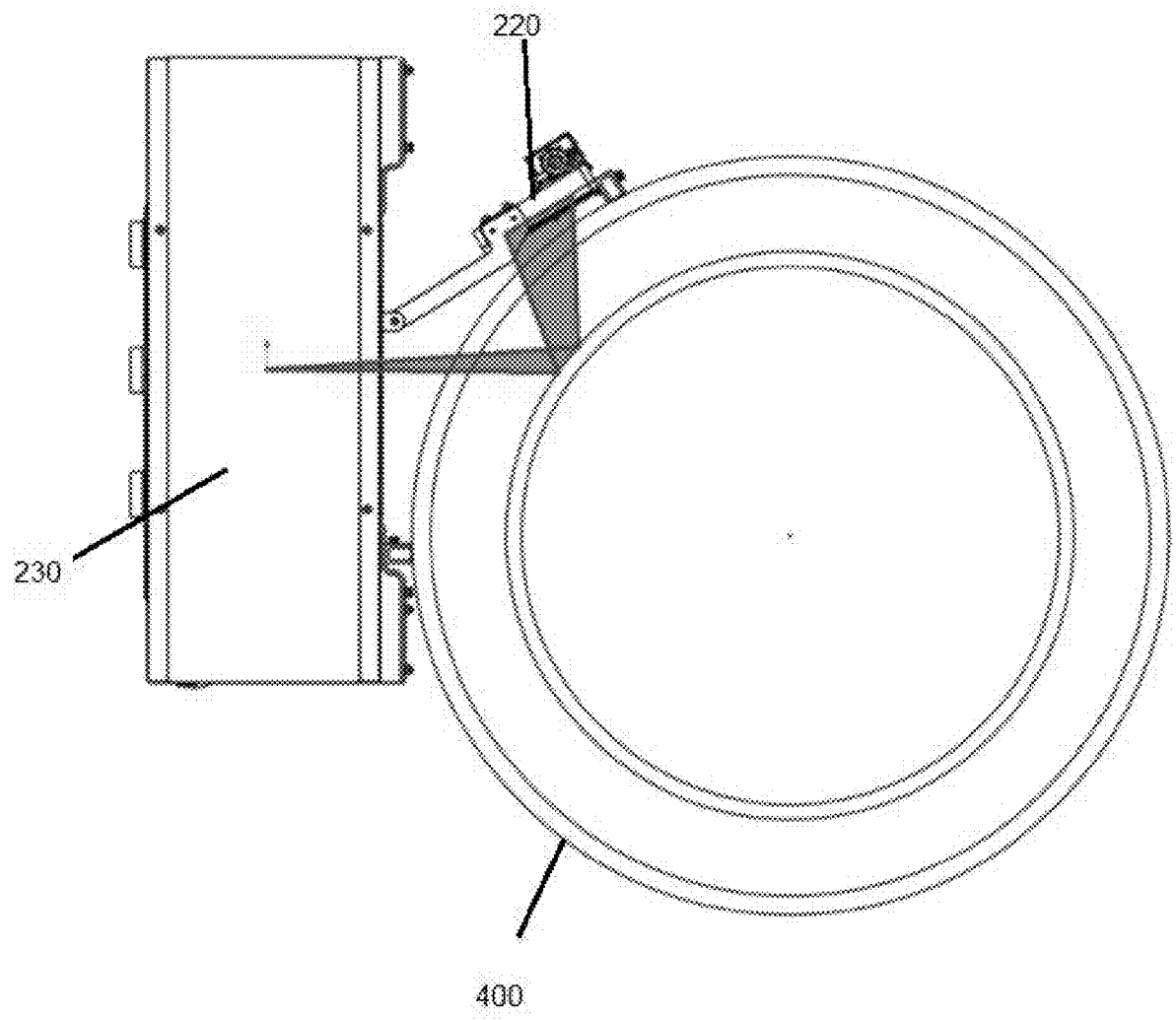
FIG. 4 is a cutaway view in partial perspective illustrating a backsplatter technique.

Referring additionally to FIG. 4, X-ray source 230 typically is a Betatron accelerator having an output energy of around 7.5 MeV.

Referring back to FIG. 2, typically, digital detector array 240 need to be installed only once, such as by a diver, inside monopole 320. In various embodiments, digital detector array 240 may be placed permanently at predetermined location 321 inside the monopole 320 such as by welding or by being attached magnetically to an inner surface of transition piece 330. Where digital detector array 240 comprises a plurality of digital detector arrays 240, each such digital detector array 240 may be placed at a set of predetermined locations 321 inside monopole 320. The set of predetermined locations 321 are typically selected as locations to be inspected based on prior knowledge of locations where there is a high probability that grout damage may occur.

In embodiments, referring back to FIG. 1, marinized digital detector array and betatron source 200 may further comprise one or more selectively engageable electromagnets 210 of sufficient strength that, when energized, can attach marinized digital detector array and betatron source 200 to subsea metallic structure 400. Subsea metallic structure 400 may comprise a pin pile.

In certain embodiments, system 1 further comprises cage style tether management system (TMS) 300. Cage style TMS 300 typically comprises at least one radiographic assembly 310.

Figure 3:
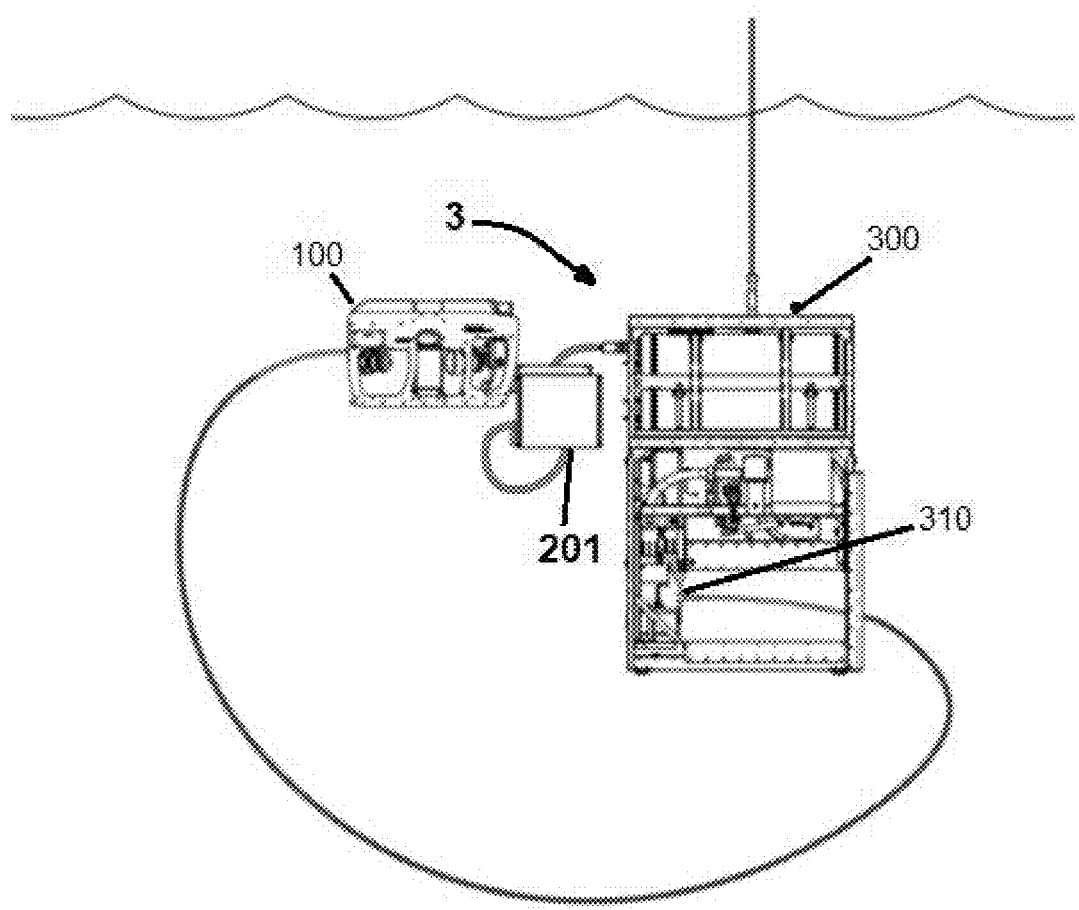
FIG. 3 is a view in partial perspective of an exemplary system for inspection of grouting in jacket pin piles on offshore wind turbines.

In a further envisioned embodiment, referring generally to FIG. 3, subsea grout inspector 3 comprises maneuverable marinized digital detector array and betatron source 201, cage style tether management system ("TMS") 300, and one or more remotely operated vehicles 100. Marinized digital detector array and betatron source (201) is manipulatable by ROV 100.

In this embodiment, marinized digital detector array and betatron source 201 comprises X-Ray source 230 (FIG. 4) and X-Ray detector plate 220 (FIG. 4), similar to those described above, and TMS 300 comprises one or more radiographic assemblies 310 operatively in communication with maneuverable marinized digital detector array and betatron source 201. As with the prior embodiment, marinized digital detector array and betatron source 201 may further comprise one or more electromagnets 210 (FIG. 1) of sufficient strength when energized to attach the marinized digital detector array and betatron source 201 to metallic structure 400 subsea (FIG. 1). Metallic structure 400 may be a jacket pin pile or the like.

Referring still generally to FIG. 3, system 1 for subsea inspection of a monopole grout furthers comprises one or more subsea vehicles 100 which, as above, may be an ROV, an AUV, a hybrid vehicle, or the like.

In either system 1 or system 3, cage style TMS 300 may be configured to allow garaging of subsea vehicle 100.

Figure 2:
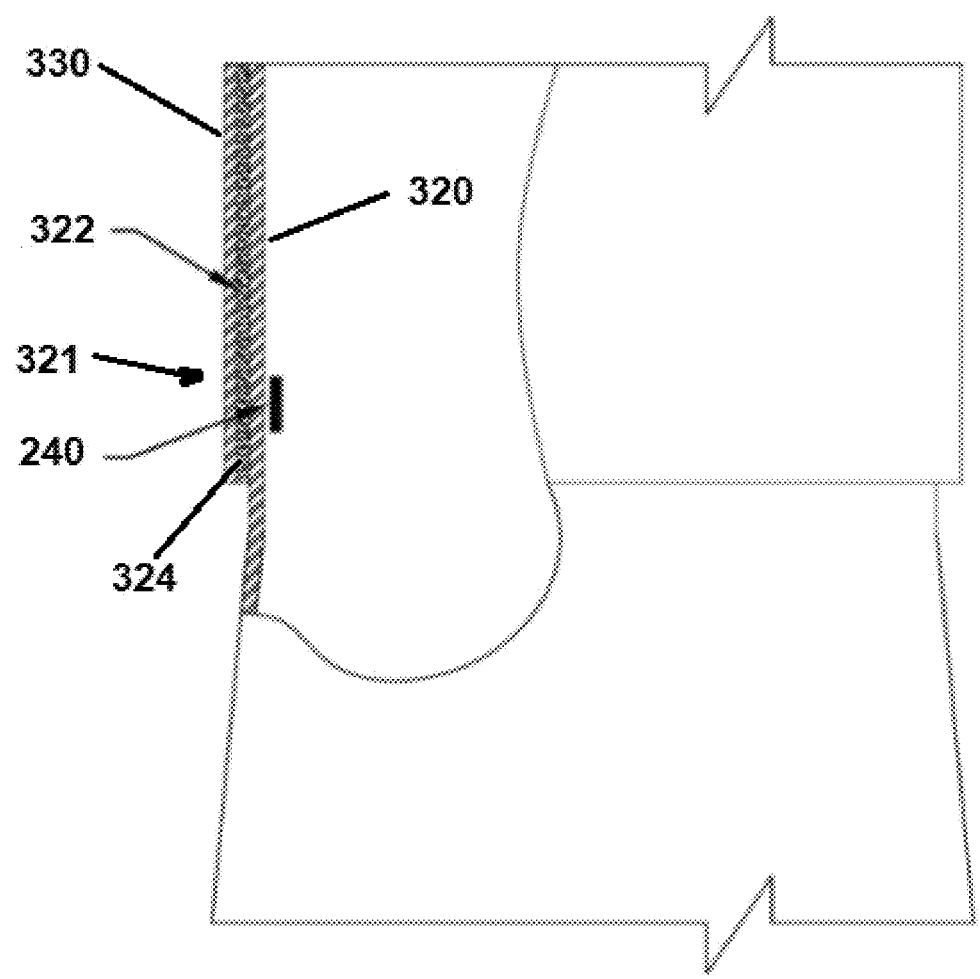
FIG. 2 is a cutaway view illustrating placement of various components of an exemplary system for subsea inspection of a monopole grout.

In the operation of exemplary embodiments, grouting between a monopole and a transition piece may be inspected using system 1, as described above, by placing one or more digital detector arrays 240 (FIG. 2) at a predetermined set of inspection locations 321 (FIG. 2) inside monopole 320 (FIG. 2) proximate junction 321 (FIG. 2) between monopile 320 and transition piece 330 (FIG. 2) where junction 321 comprises grout 322 (FIG. 2). Subsea vehicle 100 (FIG. 1) is flown to a location proximate digital detector array 240 or, if there are a plurality of digital detector arrays 240, a location proximate to a first digital detector array 240. Piloting of subsea vehicle 100 to fly it to a desired location may be autonomous, local, remotely over satellite link, or the like, or a combination thereof.

Marinized digital detector array and betatron source 200 (FIG. 1) is then used to bombard monopile 320 (FIG. 2) with x-rays at predetermined inspection location 321 (FIG. 2) where bombarding monopile 320 with x-rays at the predetermined inspection location 321 may use a backscatter technique, such as is illustrated in FIG. 4.

A portion of the x-rays are reflected and detector plate 220 (FIG. 4) used to detect the reflected x-rays. An image is generated of the predetermined inspection location using the detected, refracted x-rays where this generated image is a radiographic image sufficient to provide information on a discontinuity inside grout 330 (FIG. 2) that can be quantified.

As noted above, typically, digital detector array 240 (FIG. 2) needs to be installed only once, such as by a diver, inside monopole 320 (FIG. 2). From then on, marinized digital detector array and betatron source 200 or 201 can be deployed by subsea vehicle 100 to collect images, depending on the frequency of inspection that is needed.

The generated images may be stored in writeable memory such as internal RAM or other memory (not shown in the drawings) and may be transmitted by any suitable data connection pathway such as Ethernet, RS485, fiber-optic tether, or the like. This can either be back to cage style TMS 300 via the tether shown in FIG. 1 or back to subsea vehicle 100 via a tether (not shown in the figures).

The process above by which marinized digital detector array and betatron source 200,201 is used to bombard monopile 320 (FIG. 2) with x-rays at predetermined inspection location 321 (FIG. 2), a portion of the x-rays reflected and detector plate 220 (FIG. 2) used to detect the reflected x-rays, and an image generated of the predetermined inspection location using the detected, refracted x-rays may be repeated until a predetermined number of images are generated.

In embodiments where there are a plurality of detector plates 220 (FIG. 2) placed at a plurality of predetermined inspection locations 321 (FIG. 2) inside monopole 320 (FIG. 2), marinized digital detector array and betatron source 200,201 is typically maneuvered proximate first detector plate 220 of the plurality of detector plates 220, a first exposure generated at first detector plate 220, and marinized digital detector array and betatron source 200,201 moved to a next detector plate 220 of the plurality of detector plates 220, e.g. along an arc (FIG. 1), after the exposure at first detector plate 220 to next detector plate 220. At each subsequent next detector plate 220 a next exposure is generated and a plurality of such images comprising each such exposure collected. The collected images are reconstructed to identify defects in grout 330 (FIG. 2).

Referring generally to FIG. 1, where system 1 further comprises cage style TMS 300, as described above, and marinized digital detector array and betatron source 200 further comprises selectively engageable electromagnet 210, subsea vehicle 100 is deployed in cage style TMS 300 and allowed to exit cage style TMS 300, typically then autonomously docking with system 1. Subsea vehicle 100 may be deployed in cage style TMS 300 from a manned surface vessel or an autonomous surface vessel or the like. Subsea vehicle 100 is then flown to a location proximate to monopole 320 (FIG. 2) and/or subsea metallic structure 400, e.g. a jacket pin pile, and marinized digital detector array and betatron source 200 positioned or otherwise placed on or proximate to a location to be inspected, such as by using subsea vehicle 100 to fly marinized digital detector array and betatron source 200 to monopile 320 (FIG. 2) and positioning itself opposite detector plate 220 where electromagnet 210 may be energized to hold marinized digital detector array and betatron source 200 to monopile 320 or subsea metallic structure 400.

In certain embodiments, a reference on an outer surface of monopile 320 may be marked at a region of monopile 320 (FIG. 2) for subsea vehicle 100 to use as an aid in positioning marinized digital detector array and betatron source 200 proximate that region while performing inspection once digital detector array 240 is installed.

In a further embodiment, grouting in jacket pin piles on offshore wind turbines may be inspected using system 1 or system 3, as described above, by deploying subsea vehicle 100 in cage style TMS 200, which is as described above, allowing subsea vehicle 100 to exit cage style TMS 200 and autonomously dock to marinized digital detector array and betatron source 201; and flying subsea vehicle 100 to subsea structure 400 which is to be inspected. The piloting of subsea vehicle 100 may be accomplished locally or remotely over satellite link. Moreover, subsea vehicle 100 may be deployed subsea using a manned surface vessel or an autonomous surface vessel.

Once in position, subsea vehicle 100 may be used to place marinized digital detector array and betatron source 201 in a location proximate subsea structure 320,400 to be inspected and marinized digital detector array and betatron source 201 used to bombard subsea structure 320,400 with x-rays. A portion of the x-rays are allowed to be reflected and detected by detector plate 220 such as by using a backscatter methodology. An image of subsea structure 400 is generated using the detected, reflected x-rays.

If desired, marinized digital detector array and betatron source 201 and detector plate 220 may be moved about subsea structure 400 from a first inspection location to a second inspection location, such as along an arc, to collect a plurality of images and the plurality of images used to create a reconstructed model which can be used to identify defects in grout 330 (FIG. 2). The reconstructed model typically comprises a map of grout and steel thickness, grout density, voids and cracking or fracturing generated using the identified defects.

This process of moving of subsea vehicle 100 from a first inspection location to a second inspection location may be repeated until inspection of a predetermined set of inspection locations has been completed.

In either process embodiment, marinized digital detector array and betatron source 200,210 may be used to bombard subsea structure 400 with x-rays, creating reflected x-rays, the reflected x-rays detected by detector plate 220, and the image generated using the detected, reflected x-rays while a second subsea device, e.g. another subsea vehicle 100, is performing an inspection function for which the second subsea vehicle 100 has been configured to perform. This inspection function may further comprise marine growth cleaning, general inspection and remedial works of scour protection, J-tube seals and cathodic protection, grout seals, cable protection systems or cable position analysis.

In either method, if marinized digital detector array and betatron source 200,201 further comprises electromagnet 210, electromagnet 210 may be selectively energized to engage marinized digital detector array and betatron source 200,201 to subsea structure 320,400 or disengage marinized digital detector array and betatron source 200,201 from subsea structure 320,400.

Figure 5:
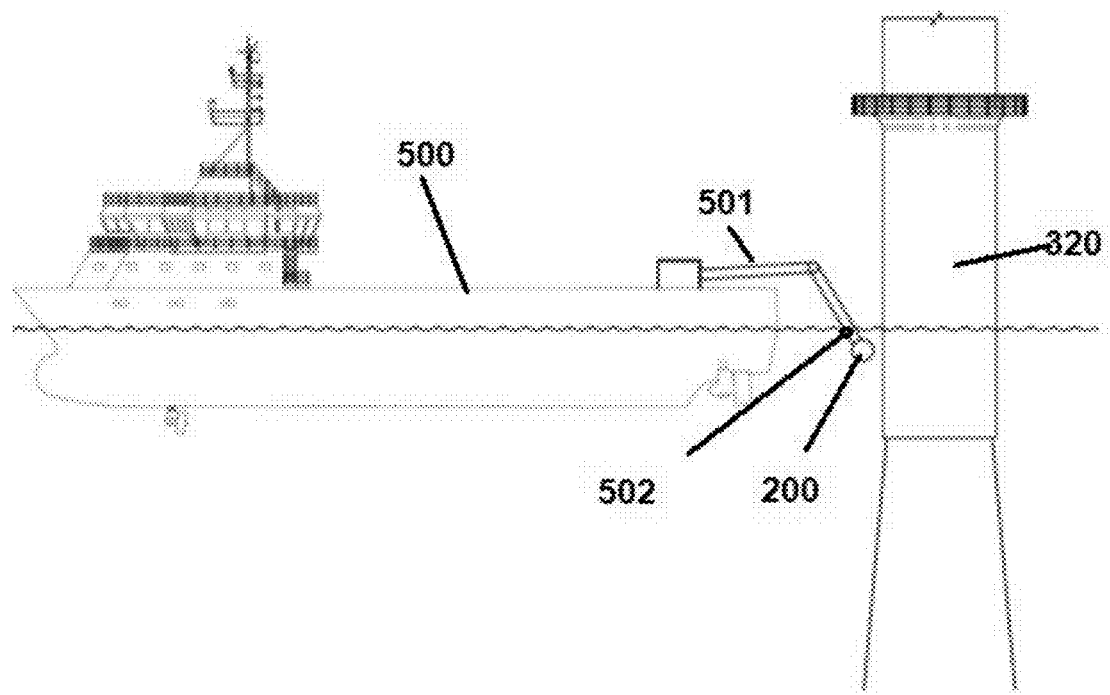
FIG. 5 is a view in partial perspective of a further embodiment of an exemplary system.

In a first alternative solution, a heave compensated arm may be used to inspect the area in a splash zone and above the waterline where marinized digital detector array and betatron source 200,201 is mounted to the end of arm 501. (FIG. 5.) Arm 201 may comprise one or more sensors 502 installed such that arm 501 could maintain position relative to monopile 320 as vessel 500 heaves. Arm 201 would have the capability to place marinized digital detector array and betatron source 200,201 both above and below the surface of the water.

Figure 6:
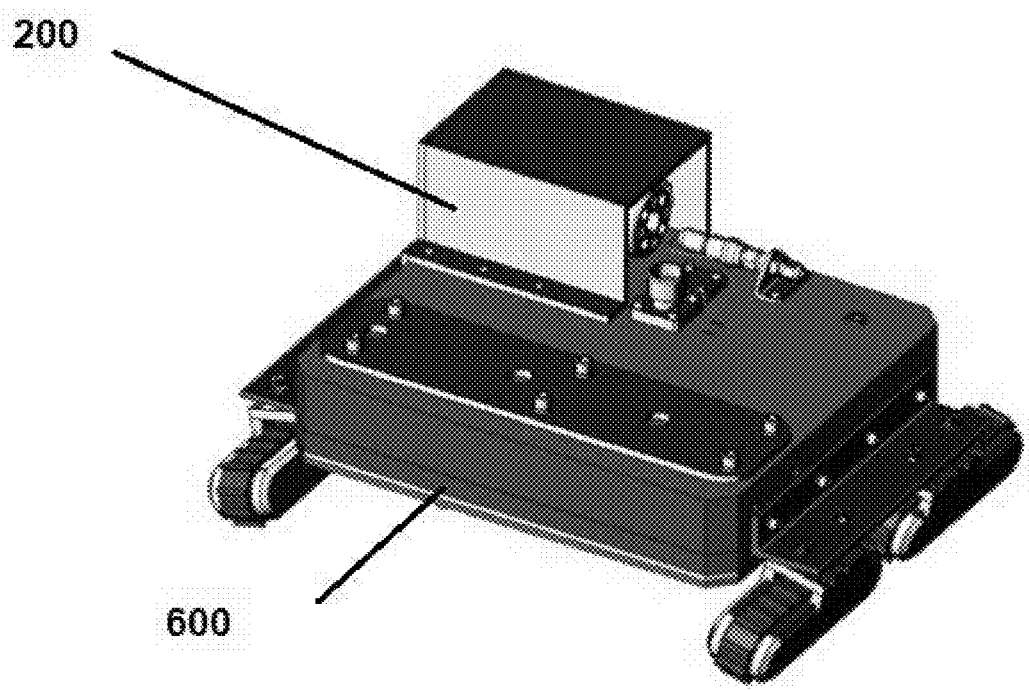
FIG. 6 is a view in partial perspective of a further embodiment of an exemplary system using a crawler.

In a second alternative solution, marinized digital detector array and betatron source 200,201 is attached to crawler 600 (FIG. 6) which may be deployed via subsea vehicle 100 (FIG. 1) or vessel 500 (FIG. 5). Crawler 600 then could position itself where required, both above and below the waterline.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A marinized digital detector array and betatron source, the marinized digital detector array and betatron source comprising:
   a. an X-Ray source;
   b. a digital detector array adapted to be permanently positioned at a predetermined location inside a monopole at a junction between the monopile and a transition piece; and
   c. a detector plate.

2. A system for subsea inspection of a monopole grout, comprising:
   a. a subsea vehicle; and
   b. a marinized digital detector array and betatron source operatively connected to the subsea vehicle, the marinized digital detector array and betatron source comprising:
     i. an X-Ray source;
     ii. a digital detector array adapted to be placed permanently at a predetermined location inside a monopole; and
     iii. a detector plate.

3. The system for subsea inspection of a monopole grout of claim 2, wherein the subsea vehicle comprises a remotely operated vehicle (ROV), an autonomous underwater vehicle (AUV), or a hybrid vehicle.

4. The system for subsea inspection of a monopole grout of claim 2, further comprising a cage style tether management system (TMS), the cage style TMS comprising a radiographic assembly.

5. The system for subsea inspection of a monopole grout of claim 2 wherein the marinized digital detector array and betatron source further comprises a selectively engageable electromagnet of sufficient strength that, when energized, attaches the marinized digital detector array and betatron source to a subsea metallic structure.

6. The system for subsea inspection of a monopole grout of claim 5 wherein the subsea metallic structure comprises a pin pile.

7. The system for subsea inspection of a monopole grout of claim 2 wherein the digital detector array comprises a plurality of digital detector arrays adapted to be placed at a set of predetermined locations inside the monopole.

8. A method of inspection of a monopole grout using a system for inspection of a monopole grout comprising a subsea vehicle, a marinized digital detector array and betatron source operatively connected to the subsea vehicle where the marinized digital detector array and betatron source comprises an X-Ray source, a digital detector array permanently placed at the predetermined location inside the monopole, and a detector plate, the method comprising:
   a. permanently placing the digital detector array at a predetermined inspection location inside a monopole proximate a junction between the monopile and a transition piece, the junction comprising grout;
   b. flying the subsea vehicle to a location proximate the digital detector array;
   c. using the marinized digital detector array and betatron source to bombard the monopile with x-rays at the predetermined inspection location;
   d. allowing reflection of a portion of the x-rays;
   e. using the detector plate to detect the reflected x-rays; and
   f. generating an image of the predetermined inspection location using the detected, refracted x-rays.

9. The method of inspection of a monopole grout using a system for inspection of a monopole grout comprising a subsea vehicle of claim 8, wherein the system further comprises a cage style tether management system (TMS) which comprises a radiographic assembly and the marinized digital detector array and betatron source further comprises a selectively engageable electromagnet of sufficient strength that, when energized, attaches the marinized digital detector array and betatron source to a subsea metallic structure, the method further comprising:
   a. deploying the subsea vehicle in the cage style TMS;
   b. allowing the subsea vehicle to exit the cage style TMS and autonomously dock with the system for inspection of a monopole grout;
   c. flying the subsea vehicle to a subsea metallic structure;
   d. placing the marinized digital detector array and betatron source in a location to be inspected, the subsea vehicle flying the marinized digital detector array and betatron source to the monopile and positioning itself opposite the detector plate; and
   e. energizing the electromagnet to hold the marinized digital detector array and betatron source to the subsea metallic structure.

10. The method of inspection of a monopole grout using a system for inspection of a monopole grout comprising a subsea vehicle of claim 9, wherein the subsea vehicle is deployed in the cage style TMS from a manned surface vessel or an autonomous surface vessel.

11. The method of inspection of a monopole grout using a system for inspection of a monopole grout comprising a subsea vehicle of claim 8, further comprising storing the generated image internally a writeable memory.

12. The method of inspection of a monopole grout using a system for inspection of a monopole grout comprising a subsea vehicle of claim 8, further comprising transmitting the generated image to a remote location via a data connection pathway.

13. The method of inspection of a monopole grout using a system for inspection of a monopole grout comprising a subsea vehicle of claim 8, further comprising repeating the process until a predetermined number of images are generated.

14. The method of inspection of a monopole grout using a system for inspection of a monopole grout comprising a subsea vehicle of claim 8, wherein the system comprises a plurality of detector plates placed at a plurality of predetermined inspection locations inside the monopole, the method further comprising:
   a. maneuvering the marinized digital detector array and betatron source proximate a first detector plate of the plurality of detector plates;
   b. generating a first exposure at the first detector plate;
   c. moving the marinized digital detector array and betatron source to a next detector plate of the plurality of detector plates along an arc after the exposure at the first detector plate to a next detector plate;
   d. generating a next exposure at the next detector plate;
   e. collecting a plurality of images comprising each such exposure; and
   f. reconstructing the plurality of images to identify defects in the grout.

15. The method of inspection of a monopole grout using a system for inspection of a monopole grout comprising a subsea vehicle of claim 8, further comprising selecting a set of desired locations to be inspected based on prior knowledge of locations where there is a high probability of grout damage to occur.

16. The method of inspection of a monopole grout using a system for inspection of a monopole grout comprising a subsea vehicle of claim 8, further comprising marking a reference on an outer surface of the monopile at a region of the monopole for the subsea vehicle to aid in positioning the marinized digital detector array and betatron source proximate that region while performing inspection once the digital detector array is installed.

17. The method of inspection of a monopole grout using a system for inspection of a monopole grout comprising a subsea vehicle of claim 8, wherein piloting of the subsea vehicle is autonomous.

18. The method of inspection of a monopole grout using a system for inspection of a monopole grout comprising a subsea vehicle of claim 8, wherein piloting of the subsea vehicle is local.

19. The method of inspection of a monopole grout using a system for inspection of a monopole grout comprising a subsea vehicle of claim 8, wherein piloting of the vehicle is remotely over satellite link.

20. The method of inspection of a monopole grout using a system for inspection of a monopole grout comprising a subsea vehicle of claim 8, wherein the generated image is a radiographic image sufficient to provide a quantifiable, predetermined set of information regarding a discontinuity inside the grout.

21. The method of inspection of a monopole grout using a system for inspection of a monopole grout comprising a subsea vehicle of claim 8, wherein bombarding the monopile structure with x-rays at the predetermined inspection location uses a backscatter technique.

* * * * *